United States Patent [19]

Schick et al.

[11] Patent Number: 4,847,316

[45] Date of Patent: Jul. 11, 1989

[54] AQUEOUS DISPERSION BLENDS OF POLYESTERS AND POLYURETHANE MATERIALS AND PRINTING INKS THEREFROM

[75] Inventors: Martin F. Schick; William C. Hickman; Gary T. Clark; Rebecca R. Stockl, all of Kingsport, Tenn.

[73] Assignee: Eastman Kodak Company, Rochester, N.Y.

[21] Appl. No.: 151,685

[22] Filed: Feb. 2, 1988

Related U.S. Application Data

[63] Continuation-in-part of Ser. No. 47,247, May 6, 1987, abandoned.

[51] Int. Cl.[4] .......................... C08K 5/34; C08K 5/15; C08K 5/23; C08L 67/02
[52] U.S. Cl. .......................... 524/88; 524/94; 524/107; 524/159; 524/160; 524/190; 524/376; 524/377; 524/386; 524/389; 524/431; 524/539; 524/538; 525/424; 525/440
[58] Field of Search .............. 524/539, 376, 377, 386, 524/389, 88, 107, 94, 160, 190, 159, 431, 538; 525/440, 424

[56] References Cited

U.S. PATENT DOCUMENTS

| | | | |
|---|---|---|---|
| 3,546,008 | 12/1970 | Shields | 117/138.8 |
| 3,607,813 | 9/1971 | Purcell | 260/29.6 |
| 3,734,874 | 5/1973 | Kibler et al. | 260/29.2 E |
| 3,779,993 | 12/1973 | Kibler et al. | 260/75 S |
| 3,907,736 | 9/1975 | Barton | 260/29.4 R |
| 4,072,644 | 2/1978 | Hedrick | 260/29.6 |
| 4,079,028 | 3/1978 | Emmons et al. | 260/29.6 |
| 4,104,262 | 4/1978 | Schade | 528/295 |
| 4,145,469 | 3/1979 | Newkirk | 428/245 |
| 4,148,779 | 4/1979 | Blackwell et al. | 260/40 |
| 4,155,892 | 5/1979 | Emmons et al. | 260/29.2 |
| 4,165,307 | 8/1979 | Mizuno et al. | 525/440 |
| 4,180,491 | 12/1979 | Kim et al. | 260/29.2 |
| 4,233,196 | 11/1980 | Sublett | 260/29.2 N |
| 4,279,801 | 7/1981 | Kramer et al. | 525/440 |
| 4,304,900 | 12/1981 | O'Neil et al. | 528/290 |
| 4,304,901 | 12/1981 | O'Neil et al. | 528/290 |
| 4,335,220 | 6/1982 | Coney | 523/414 |
| 4,525,524 | 6/1985 | Tung et al. | 524/60.1 |
| 4,595,611 | 6/1986 | Quick | 428/35 |
| 4,704,309 | 11/1987 | Coney et al. | 427/258 |

FOREIGN PATENT DOCUMENTS

| | | | |
|---|---|---|---|
| 57-10663 | 1/1982 | Japan | 524/603 |
| 2097005 | 6/1982 | United Kingdom . | |

OTHER PUBLICATIONS

Rohm & Haas, Inc.; Polymers, Resins and Monomers, *Acrysol RM-825*, Fheology Modifier for Coatings; Oct. 1985.

Defensive Publication T-949001, (Copy attached), Aug. 3, 1976-949 O.G. 8, James G. Pacifici.

*Primary Examiner*—Lewis T. Jacobs
*Attorney, Agent, or Firm*—Thomas R. Savitsky; William P. Heath, Jr.

[57] ABSTRACT

Compositions useful as printing inks or as dry or wet concentrates for the preparation of inks, comprising substantially homogenous blends of from about 0.1 to about 50.0 wt. % water dispersible polyurethane, and conversely from about 99.9 to about 50.0 wt. % water dispersible polyester, and preferably containing from about 1.0 to about 95.0 wt. % of a solvent system comprising water or water admixed with cosolvent, the cosolvent comprising up to about 30.0 wt. % of the solvent system. These blends show exceptionally marked improvements in certain physical properties such as: stability of viscosity to ambient and process conditions; linearity of viscosity change with water dilution; consistency of viscosity for a great variety of pigments; and greatly improved shelf-life (no significant polymer segregation of layering). Such properties greatly enhance the utility of these blends for use in pigmented or dyed printing inks and in other substrate coating formulations which may or may not contain colorants. Also disclosed is a process useful for the preparation of such compositions.

36 Claims, No Drawings

AQUEOUS DISPERSION BLENDS OF POLYESTERS AND POLYURETHANE MATERIALS AND PRINTING INKS THEREFROM

This application is a continuation-in-part of application Ser. No. 047,247filed May 6, 1987 now abandoned.

FIELD OF INVENTION

This invention concerns substantially homogenous aqueous dispersion blends of certain polyester and polyurethane materials wherein the polymers are water dispersible, water soluble or water dissipatable, all hereinafter termed "water dispersible". These blends have substantial utility in the printing ink and substrate coatings fields, for example, as extenders. The present invention also concerns a process for the manufacture of such blends.

BACKGROUND OF THE INVENTION

In the field of coatings, and in particular in the field of water-based coatings such as in printing inks and the like, wherein the coatings employ water dispersible polyester material as the ink varnish or binder, with or without colorants, problems associated with viscosity are commonly encountered and affect formulation and preparation of the coating compositions, their use, and the coated product appearance. For example, in the manufacture and use of conventional water-based, polyester containing printing inks, one is confronted in many instances with such problems as: limited viscosity range obtainable with such inks; substantial changes in viscosity of the ink compositions, e.g., during processing, particularly during operations wherein heating and/or shearing occurs, including printing, in particular, when thixotropic phenomena are present which reduce the shear viscosity of the polymer dispersion to a point where proper dispersal of the desired amounts of colorant therein by typical mixing apparatus becomes virtually impossible in that adequate shear is not developed to separate the pigment agglomerate; non-linear and unpredictable viscosity changes of the aqueous ink compositions with respect to polyester concentration; unpredictable build in viscosity of the ink compositions with time; difficulty in developing full pigment color during processing, as in milling operations wherein adequate viscosities of the compositions have not been achieved; and hazing and diminished gloss of the dried films such as occurs with conventional viscosity modifiers.

SUMMARY OF THE INVENTION

Principal objects of the present invention are: to eliminate one or more and preferably all of the above viscosity related problems in a cost effective and efficient manner whereby negative effects on the coating compositions are minimal or nonexistent; to provide means to quickly and easily extend the ink varnish or colorant (reduce color density) at press side without employing large amounts of polyester, and to provide a process for the rapid preparation of pigmented or otherwise colored substantially homogeneous systems containing water dispersible polyesters which normally exhibit thixotropic behavior.

Accordingly, the present invention is directed to compositions useful as inks or as dry or wet concentrates for the preparation of inks, comprising substantially homogenous blends of from about 0.1 to about 50.0 wt. % water dispersible polyurethane, and conversely from about 99.9 to about 50.0 wt. % water dispersible polyester, and preferably containing from about 1.0 to about 95.0 wt. % of a solvent system comprising water or water admixed with cosolvent, said cosolvent comprising up to about 30.0 wt. % of said solvent system.

The present invention is also directed to a process for preparing colored, aqueous inks or ink concentrates containing substantial amounts of water dispersible polymeric (i.e., polyester) material which normally exhibits thixotropic behavior.

More specifically, the process of the present invention comprises blending a mixture comprising:
(A) a water dispersible polyester material which normally exhibits thixotrophic behavior,
(B) a colorant, which is essentially insoluble in the polyester material, in the form of aggregates, and
(C) an effective amount of water dispersible polyurethane material, under sufficient blending conditions such that the size of said aggregates is reduced.

In such process it is preferred that said mixture comprises
(A) from about 3 to about 60 weight % of said water dispersible polyester material,
(B) from about 0.1 to about 85 weight % of said colorant,
(C) from about 0.1 to about 20 weight % of said water dispersible polyurethane material, and
(D) from 0 to about 75 weight % of a solvent comprising water.

The mixture of such process is preferably a stock mixture which is either a separate premix of the polymers and pigment, with or without water, or which is a mixture of these materials which have been fed separately or in any combination to a suitable blender.

As used herein, "normally exhibits thixotropic behavior" means that the water dispersible polyester material exhibits thixotropic behavior in the absence or substantial absence of water dispersible polyurethane material; "thixotropic behavior" means that a reduction in viscosity takes place with continuing shear at the same shear rate to some minimum value, and on termination of the shearing stress, an immediate or gradual recovery of the viscosity loss takes place; "effective amount" means that amount of water dispersible polyurethane material effective to result in the size of colorant aggregates to become reduced under sufficient blending conditions; and "sufficient blending conditions" includes those conditions that have forces that are the same or greater than those forces present in a high speed discspercer (i.e., disc cavitation mixer or high speed disk impeller) operated at a peripheral or tip speed of about 1,000 feet/minute; preferred is a tip speed of about 4,000 to about 6,000 feet/minute.

DETAILED DESCRIPTION OF THE INVENTION

The blends of the invention show exceptionally marked improvements in certain physical properties such as: stability of viscosity to amibent and process conditions; linearity of viscosity change with water dilution; consistency of viscosity for a great variety of pigments; and greatly improved shelf-life (no significant polymer segregation or layering). Such properties greatly enhance the utility of these blends for use in pigmented or dyed printing inks and in other substrate coating formulations which may or may not contain colorants, particularly since the polyurethane component is highly compatible with such systems and shows no adverse effects on such properties as film blocking, adhesion, gloss, haze or the like. In this regard, these blends are extremely useful as extenders for various pigmented or dye colored systems such as printing inks in that viscosity of the ink can be decreased, increased, or retained by the addition of the present extenders, without markedly increasing, if at all, the polyester levels.

By way of the process of this invention the colorant (pigment, disperse dye, etc.) aggregates (or agglomerates) are very rapidly reduced in size since the viscosity of the system under sufficient blending conditions is maintained. This rapid and effective aggregate reduction achieves two principal objectives. The first is that the stock mixture can be formulated, e.g., for low pigment loading which would normally produce ineffective pigment reduction, but which, by virtue of the polyurethane material now promotes excellent pigment reduction. The second is that in high pigment content formulations, the viscosities under sufficient blending conditions do not tend to diminish to ineffective levels and the resulting rapid pigment reduction gives a flowable, pumpable material very quickly and avoids such problems as filter or pump clogging.

The blending equipment useful for carrying out the present process should be capable of stirring, milling or otherwise mixing to achieve sufficient blending conditions. Such blending equipment includes dispersion equipment requiring: very high viscosity such as two-roll rubber mills, and Banbury (sigma blade) mills; high viscosity such as three-roll paint mills; medium viscosity such as high-speed stone mills and high speed disk impellers, for example, a Hockmeyer High Speed Discperser ® (Model 2HL) or a Cowles mixer; and low viscosity such as sand mills, ball and pebble mills, attritors and vibratroy mills, and kinetic dispersion mills.

In the preferred process of the present invention it is more preferred that the weight % of component (A) is from about 5% to about 40%, the weight % of component (B) is from about 10% to about 75%, the weight % of component (C) is from about 0.2% to about 15%, and the weight percent of component (D) is from about 1% to about 40%.

It is also preferred that the present process is carried out at a temperature of from about 0° C. to about 100° C. for about 1 minute to about 1 hour.

In the process of the invention it is typical that the average size of said aggregates before blending is greater than about 100 microns in diameter and the average size of said aggregates after blending is less than about 50 microns in diameter, preferably less than about 1 micron in diameter.

To break down the colorant aggregates sufficient forces must be exerted by one or more means to overcome the forces holding the aggregate together such as: (1) by physical impact, (2) by particle-particle attrition, and/or (3) by shear transmitted through an intermediate fluid layer. Usually most of the size reduction is accomplished by shear transmitted through the fluid layer surrounding the aggregate or by impingement of the aggregate against a hard surface.

When a high speed discspercer is operated at a perpheral speed of between 1,000 and 4,000 feet/minute for a typical starting mixture, typically the forces present will include a high shear rate of greater than about 3,000 sec.$^{-}$, preferably greater than or equal to about 10,000 sec.$^{-}$. For example, typical forces of a Cowles mixer operated at such a peripheral speed range for a typical starting mixture may include a shear rate of about 20,000 sec.$^{-1}$ and a shear stress of about 6 pounds/inches. As appreciated by a skilled artisan, for any given type of blending equipment under any given set of conditions, the effective amount of water dispersible polyurethane material can vary and can be determined using conventional blending technology.

The polyurethanes useful in the compositions and process of the present invention include those disclosed in U.S. Pat. Nos. 4,180,491; 4,155,892; and 4,079,028, the disclosures of which are incorporated herein by reference. In these polymers, as stated in 4,079,028, the polyether segments have molecular weights of at least 1500 (preferably 3000-20,000), the polymers contain, on the average, at least three hydrophobic groups and at least two water soluble polyether segments linking the hydrophobes, the sum of the carbon atoms in the hydrophobic groups being at least 20, preferably at least 30, and the total molecular weight is about 10,000-200,000, preferably 12,000-150,000. The optimum polyether content will depend, of course, on the bulk and distribution of the hydrophobic groups in the polymer. Whereas a total polyether molecular weight of 4000-5000 may be suitable when the polymer contains small external and internal hydrophobes, the polyether content may have to be substantially increased when heavier and/or more extensively branched hydrophobic groups are to be built into the polymer, such as long chain fatty polyols or amines. About 200 carbon atoms in the hydrophobic portion is the practical upper limit although it will be understood that it is a relative matter since the proportion of polyether may be increased to offset increased hydrophobicity. However, as total molecular weight increases the viscosity increases and ease of handling decreases, and therefore the economic usefulness of the products is substantially diminished.

The water dispersible polyester materials useful in the compositions and process of the present invention are non-polyurethane polymers which comprise at least one linear, water dissipatable polymer having carbonyloxy (i.e., ester) linking groups in the linear molecular structure wherein up to 80% of the linking groups may be carbonylamido (i.e., amide) linking groups, the polymer having an inherent viscosity of from about 0.1 to about 1.0 measured in a 60/40 parts by weight solution of phenol/tetrachloroethane at 25° C. and at a concentration of 0.25 gram of polymer in 100 mL og the solvent, the polymer comprising the condensation reaction products of (a), (b), (c) and (d) from the following components or the ester forming or esteramide forming derivatives thereof;

(a) at least one difunctional dicarboxylic acid which is not a sulfomonomer;

(b) from about 4 to about 25 mole percent, based on a total of all acid, hydroxyl and amino equivalents being equal to 200 mole percent, of at least one difunctional sulfomonomer containing at least one metallic sulfonate group attached to an aromatic hydrocarbon nucleus or cycloaliphatic nucleus wherein the functional groups are hydroxy, carboxyl or amino;

(c) at least one difunctional reactant which is not a sulfomonomer selected from a glycol or a mixture of a glycol and diamine having two —NRH groups, the glycol containing two —CH$_2$—OH groups of which (1) at least 15 mole percent, based on 100 mole percent of hydroxy or hydroxy and amino equivalents, is a poly(ethylene glycol) having the structural formula

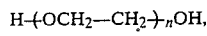

n being an integer of from 2 to about 20, or
(2) of which from about 0.1 to less than about 15 mole percent, based on 100 mole percent of hydroxy or hydroxy and amino equivalents, is a poly(ethylene glycol) having the structural formula

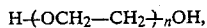

n being an integer of between 2 and about 500, and with the proviso that the mole percent of said poly(ethylene glycol) within said range is inversely proportional to the quantity of n within said range; and
(d) from none to at least one difunctional reactant selected from a hydroxycarboxylic acid having one —C(R)$_2$—OH group, an aminocarboxylic acid having one —NRH group, and an amino-alcohol having one —C(R)$_2$—OH group and one —NRH group, or mixtures of said difunctional reactants;
wherein each R in the (c) or (d) reactants is a H atom or an alkyl group of 1 to 4 carbon atoms.

In the above polyester material it is preferred that very minor, e.g., less than about 10 mol % based on all reactants, of reactant (d) is employed, that at least about 70 mol % of reactant (c) is glycol, and that at least about 70 mol % of all hydroxy equivalents is present in the glycol.

In preferred embodiments of the present invention:
(a) water comprises at least about 90.0 wt. % of all the solvent system;
(b) the cosolvent is selected from diethylene glycol monomethyl ether, propylene glycol, ethylene glycol, diethylene glycol, n-propyl alcohol, isopropyl alcohol, ethyl alcohol, glycerin, ethylene glycol monoethyl ether, ethylene glycol monopropyl ether, ethylene glycol monobutyl ether, diethylene glycol monoethyl ether, diethylene glycol monopropyl ether, and diethylene glycol monobutyl ether;
(c) from about 1.0 wt. % to about 20.0 wt. % of colorant based on total weight of the press-ready ink, is present therein; and
(d) the n value of reactant (c) (2) is between about 2 and about 200.

The pigment type colorants useful in the present invention, in addition to those specifically identified below, include those described in NPIRI Raw Materials Data, Vol. 4, Pigments, Copyright 1983. The dye type colorants useful in the present invention include those classified by the Colour Index as disperse colors. They may be of any chemical class such as ezo, anthraquinone, methine, and disazo, which are characterized by the absence of any pendant water solubilizing groups such as a sulfonic acid group or a salt thereof. Such dyes also include those useful for heat transfer printing uses exemplified by C.I. Disperse Yellow 3, Disperse Yellow 85, Disperse Yellow 23, Disperse Orange 25, Disperse Red 60, Disperse Red 4, Disperse Red 78, Disperse Violet 1, Disperrse Violet 27, Disperse Blue 3, Disperse Blue 14, and Disperse Blue 35.

One or more of these disperse dyes, which also may be blended with pigments, may be blended in the same resin, if desired, to produce a resultant color, provided that no adverse chemical reaction between the dyes or the resin occurs at the dye dissolution temperature. Conventional dispersing aids, biocides, defoamers and the like may be used in the present inks if desired for their known effects.

In further preferred embodiments of the invention, the water dispersible polymeric material comprises (a) an acid component (moiety) of from about 75 to about 84 mole % isophthalic acid and conversely from about 25 to about 16 mole % 5-sodiosulfoisophthalic acid, and (b) a glycol component (moiety) of from about 45 to about 60 mole % diethylene glycol and conversely from about 55 to about 40 mole % 1,4-cyclohexanedimethanol or ethylene glycol or mixtures thereof, and wherein the weight ratio of pigment material to total polymeric material (polyester amd polyurethane) is from about 1/10 to about 2/1. With regard to the polyester material, the term "moiety" as used herein designates the residual portion of the reactant acid or glycol which actually enters into or onto the polymer chain during the condensation or polycondensation reaction.

Additional preferred embodiments of the invention are as follows:
(a) the inherent viscosity of the water-dispersible polymeric material is from about 0.28 to about 0.38, the said acid component (moiety) comprises from about 80 to about 83 mole % isophthalic acid and conversely from about 20 to about 17 mole % 5-sodiosulfoisophthalic acid, and the said glycol component (moiety) comprises from about 52 to about 56 mole % diethylene glycol and conversely from about 48 to about 44 mole % 1,4-cyclohexanedimethanol;
the pigment is one or a mixture of the following color index materials according to their generic names: C.I. Pigment Yellow 17; C.I. Pigment Blue 27; C.I. Pigment Red 49:2C.I. Pigment Red 81:1; C.I. Pigment Red 81:3; C.I. Pigment Red 81:x; C.I. Pigment Yellow 83; C.I. Pigment Red 57:1; C.I. Pigment Red 49:1; C.I. Pigment Violet 23; C.I. Pigment Green 7; C.I. Pigment Blue 61; C.I. Pigment Red 48:1; C.I. Pigment Red 52:1; C.I. Pigment Violet 1; C.I. Pigment White 6; C.I. Pigment Blue 15; C.I. Pigment Yellow 12; C.I. Pigment Blue 56; C.I. Pigment Orange 5; C.I. Pigment Black 7; C.I. Pigment Yellow 14; C.I. Pigment Red 48:2; C.I Pigment Blue 15:3; C.I. Pigment Red 53:1; C.I. Pigment Yellow 42; C.I. Pigment Brown 6; C.I. Pigment Red 101; and C.I. Pigment Black 11;
(c) the aqueous ink is coated or printed onto a substrate selected from metal foil, newspring, bleached and unbleached Kraft paper, clay coated paper, glass, calendered paper, stainless paper, paper board, and films or other substrates of polyester, polycarbonate, cellulose ester, regenerated cellulose, poly(vinylidene chloride), polyamide, polyolefin, or polystyrene;
(d) the polyurethane has a molecular weight of at least 10,000 and at least three hydrophobic branching groups, the hydrophobic groups containing a total of at least 50 carbon atoms and being linked through hydrophilic polyester segments of from about 3,000 to about 20,000 molecular weight each; wherein the polyurethane thickener is selected from the following reaction products wherein reactant (a) is at least one water soluble polyether polyol containing at least three hydroxyl groups, reactant (b) is at least one water insoluble organic diisocyanate, reactant (c) is at least one water insoluble organic polyisocyanate containing at least three isocyanate groups, reactant (d) is at least one hydrophobic organic monofunctional active hydrogen compound, reactant (e) is at least one hydrophobic organic monoisocyanate, and reactant (f) is at least one polyhydric alcohol or polyhydric alcohol ether containing three or more hydroxyl groups:

(I) reaction products of reactant (a) and (e),
(II) reaction products of reactants (a), (c) and (d),
(III) reaction products of reactants (a), (b), (d) and (f),
(IV) reaction products of reactants (a), (b), (e) and (f),
(V) reaction products of reactants (a), (b), (c) and (d),
(VI) reaction products of reactants (b), (e) and (f),
(VII) reaction products of reactants (a), (c) and (e),
(VIII) reaction products of reactants (b), (d) and (f), and (e) the polyurethane is selected from a trimethylol propane/ethylene oxide adduct capped with octyldecyl isocyanate, a dipentaerythritol/ethylene oxide adduct capped with octyldecyl isocyanate, a trimethylol propane/ethylene oxide adduct reacted with a tolylene diisocyanate polyethylene glycol condensate and capped with octadecanol, a trimethylol propane/ethylene oxide/$C_{36}$ dimer acid diisocyanate/polyethylene glycol condensate capped with octadecyl isocyanate, a polyethylene glycol/4,4'-methylenebis (isocyanatocyclohexane)/triisocyanate adduct of trimethylol propane and tolylene diisocyanate capped with hexadecanol, a polyethylene glycol/methylenedi-p-phenylene diisocyanate/triisocyanate adduct of trimethylol propane and tolylene diisocyanate condensate capped with eicosanol, a polyethylene glycol/tolylene diisocyanate/polymethylene polyphenylisocyanate condensate capped with octadecanol, a polyethylene glycol/trimethylol propane/tolylene diisocyanate condensate capped with octadecanol, a polyethylene glycol/tolylene diisocyanate/dipentaerythritol condensate capped with octadecanol, and a polyethylene glycol/trimethylol propane/tolylene diisocyanate condensate capped with perfluorododecanol.

The complete chemical definitions of the above C.I. pigments are given in the following table:

| Pigments Generic Name | C.A. Index/Chemical Name |
|---|---|
| C.I. Pigment Yellow 17 | Butanamide, 2,2'-[(3,3'-dichloro[1,1'-biphenyl] 4,4'-diyl)bis(azo)bis[N—(2-methoxyphenyl)-3-oxo- |
| C.I. Pigment Blue 27 | Ferrate (4-1), hexakis (cyano-C)-ammonium iron (3+)(1:1:1) |
| C.I. Pigment Red 49:2 | 1-Naphthalenesulfonic acid, 2-[(2-hydroxy-1-naphthalenyl)azo]-, calcium salt (2:1) |
| C.I. Pigment Red 81:1 | Benzoic acid, 2,-[6-ethylamino)-3-(ethylimino)-2,7-dimethyl-3H—xanthen-9-yl]-, ethyl ester, w/molybdenum tungsten hydroxide oxide phosphate |
| C.I. Pigment Red 81:3 | Benzoic acid, 2-[6-ethylamino)-3-ethylimino)-2,7-dimethyl-3H—xanthen-9-yl]-, ethyl ester, molybdate-silicate |
| C.I. Pigment Red 81:x | Benzoic acid, 2-[6-(ethylamino)-3-(ethylimino)-2,7-dimethyl-3H—xanthen-9-yl]-ethyl ester, molybdate- |

-continued

| Pigments Generic Name | C.A. Index/Chemical Name |
|---|---|
|  | phosphate |
| C.I. Pigment Yellow 83 | Butanamide, 2,2'-[(3,3'-dichloro[1,1'-biphenyl]-4,4'-diyl)bis(azo)bis[N—(4-chloro-2,5-dimethoxyphenyl)-3-oxo- |
| C.I. Pigment Red 57:1 | 2-Naphthalenecarboxylic acid, 3-hydroxy-4-[(4-methyl-2-sulfophenyl)azo]-, calcium salt (1:1) |
| C.I. Pigment Red 49:1 | 1-Naphthalenesulfonic acid, 2-[(2-hydroxy-1-naphthalenyl)azo]-, barium salt (2:1) |
| C.I. Pigment Violet 23 | Diindolo[3,3',2'm] triphenodioxazine, 8,18-dichloro-5,15-diethyl-5,15-dihydro- |
| C.I. Pigment Green 7 | C.I. Pigment Green 7 |
| C.I. Pigment Blue 61 | Benzenesulfonic acid, [[4-[[4-phenylamino)phenyl]-[4-(phenylimino)-2,5-cyclohexadien-1-ylidene]methyl]-phenyl]amino]- |
| C.I. Pigment Red 48:1 | 2-Naphthalenecarboxylic acid, 4-[(5-chloro-4-methyl-2-sulfophenyl)azo]-3-hydroxy-, barium salt (1:1) |
| C.I. Pigment Red 52:1 | 2-Naphthalenecarboxylic acid, 4-[(4-chloro-5-methyl-2-sulfophenyl)azo]-3-hydroxy-, calcium salt (1:1) |
| C.I. Pigment Violet 1 | Ethanaminium, N—[9-(2-carboxyphenyl)-6-(diethylamino)-3H—xanthen-3-ylidene]-N—ethyl-, molybdatetungstatephosphate |
| C.I. Pigment White 6 | Titanium oxide ($TiO_2$) |
| C.I. Pigment Blue 15 | Copper, [29H, 31H—phthalocyaninato (2-)-$N^{29}$, $N^{30}$, $N^{31}$, $N^{32}$]-, (Sp-4-1)- |
| C.I. Pigment Yellow 12 | Butanamide, 2,2'-[(3,3'-dichloro[1,1'-biphenyl]-4,4'-diyl)bis(azo)]bis[3-oxo-N—phenyl- |
| C.I. Pigment Blue 56 | Benzenesulfonic acid, 2-methyl-4-[[4-[[4-[(3-methylphenyl)amino]phenyl]-[4-[(3-methylphenyl)-imino]-2,5-cyclohexadien-1-ylidene]methyl]-phenyl]amino]- |
| C.I. Pigment Orange 5 | 2-Naphthalenol, 1-[(2,4-dinitrophenyl)azo]- |
| C.I. Pigment Black 7 | Carbon black |
| C.I. Pigment Yellow 14 | Butanamide, 2,2'-[(3,3'-dichloro[1,1'-biphenyl]-4,4'-diyl)bis(azo)]bis-[N—(2-methylphenyl)-3-oxo- |
| C.I. Pigment Red 48:2 | 2-Naphthalenecarboxylic acid, 4-[(5-chloro-4-methyl-2-sulfophenyl)-azo]-3-hydroxy-, calcium salt (1:1) |
| C.I. Pigment Blue 15:3 | Copper, [29H, 31H—phthalocyaninato (2-)-$N^{29}$, $N^{30}$, $N^{31}$, $N^{32}$]-, (SP-4-1)- |
| C.I. Pigment Red 53:1 | Benzenesulfonic acid, 5-chloro-2-[(2-hydroxy-1-naphthalenyl)azo]-4-methyl, barium salt |
| C.I. Pigment Yellow 42 | Iron oxide ($Fe_2O_3$)—hydrate |
| C.I. Pigment Brown 6 | Iron oxide ($Fe_2O_3$) |
| C.I. Pigment Red 101 | Iron oxide ($Fe_2O_3$) |

-continued

| | Pigments |
|---|---|
| Generic Name | C.A. Index/Chemical Name |
| C.I. Pigment Black 11 | Iron oxide (FeO.Fe$_2$O$_3$) |

The inherent viscosities (I.V.) of the particular polyester materials useful herein range from about 0.1 to about 1.0 determined according to ASTM D2857-70 procedure, in a Wagner Viscometer of Lab Glass, Inc. of Vineland, N.J., having a 178 mL. capillary bulb, using a polymer concentration about 0.25% by weight in 60/40 by weight of phenol/tetrachloroethane. The procedure is carried out by heating the polymer/solvent system at 120° C. for 15 minutes, cooling the solution to 25° C. and measuring the time of flow at 25° C. The I.V. is calculated from the equation $$(n)\ 25°\ C. = \frac{\ln \frac{t_s}{t_0}}{C}$$
$$0.50\%$$

where:
(n)=inherent viscosity at 25° C. at a polymer concentration of 0.25 g/100 mL of solvent;
ln=natural logarithm;
$t_s$=sample flow time; $t_o$=solvent-blank flow time; and
C=concentration of polymer in grams per 100 mL of solvent =0.25.

The units of the inherent viscosity throughout this application are in deciliters/gram. It is noted that higher concentrations of polymer, e.g., 0.50 g of polymer/100 mL solvent may be employed for more precise I.V. determinations.

In general, the water dispersible polyester materials useful in the present invention and blends thereof are excellent film formers for water based printing inks. The polymers form stable dispersions in water and produce tough, flexible films on drying. Films will form at temperatures down to just above the freezing point of water. The polymers in dispersion form may be plasticized if necessary, for example, with certain water immiscible phthalate esters to high degrees of flexibility. Printing inks prepared from the present concentrates are readily further water reducible (dilution) and the finished or press-ready inks typically comprise in % by weight, from about 55% to about 90% water, preferably from about 65% to about 75%, from about 4% to about 30% water dissipatable polymer, preferably from about 10% to about 25%, and from about 1% to about 20% pigment, preferably from about 8% to about 15%. Various types of modifiers may be used such as up to about 10.0% polyvinyl alcohol or the like. The inks dry rapidly upon printing, wet surfaces exceptionally well and have excellent adhesion to many plastic films and metal foil as well as to paper, glass, polyethylene and many other substrates. Both the 100% solids, water dissipatable polymers and the corresponding aqueous dispersions thereof may be pigmented by conventional techniques. The use of deionized water in the present invention is preferred in order to prevent premature ion exchange.

The aforedescribed polyester material is prepared according to the polyester preparation technology described in U.S. Pat. Nos. 3,734,874; 3,779,993; and 4,233,196, the disclosures of which are incorporated herein by reference, and the use of the term "acid" in the above description and in the appended claims includes the various ester forming or condensable derivatives of the acid reactants such as the dimethyl esters thereof as employed in the preparations set out in these patents. Among the preferred sulfo-monomers are those wherein the sulfonate group is attached to an aromatic nucleus such as benzene, naphthalene, diphenyl, or the like, or wherein the nucleus is cycloaliphatic such as in 1,4-cyclohexanedicarboxylic acid.

Dispersal of the present polyester material and concentrate materials in water may be done, for example, at preheated water temperature of about a 180° to about 200° F. and the polymer added as pellets to the vortex under high shear stirring. A Cowles Dissolver, Waring Blender, or similar equipment may be used. Once water is heated to temperature, additional heat input is not required. Depending upon the volume prepared, dispersal of the pellets by stirring should be complete within 15 to 30 minutes. Continued agitation with cooling may be desirable to prevent thickening at the surface due to water evaporation. Viscosities of the dispersions remain low up to nonvolatile levels of about 25%–30%, but generally increase sharply above these levels. Viscosities of the dispersions will be influenced by the degree of polymer dispersion (fineness) obtained which is affected by the dispersing temperature, shear, and time.

The present concentrates and inks may also be prepared by milling, e.g., two-roll milling the polymers themselves into a blend, or by milling the finely comminuted, polymer insoluble pigment or other colorant into the solid polyester and polyurethane material, and for the aqueous inks and semi-aqueous concentrates, thereafter dispersing the milled material in water in a manner generally similar to the procedure described in U.S. Pat. No. 4,148,779 for solubilizing organic disperse textile dyes in polyester for subsequent dispersal in water. Dispersions can also be made by adding the pigment or other colorant at high speed agitation to the polymers previously dispersed in water and then grinding in a ball mill or sand mill to further reduce pigment size in accordance with the process of the present invention.

The viscosities of the inks may, of course, range widely, e.g., from about 15 to about 60 seconds as measured in a #2 Zahn cup according to ASTM D-4212-82. The higher viscosities, e.g. from about 22 to about 60 seconds and lower water levels, e.g. from about 20 to about 55 wt. % represent semi-aqueous concentrated forms of the present inks. In this regard, in order to reduce the viscosities of these inks when necessary for certain printing apparatus and processes, varying amounts of water are added. In this water addition, the ink viscosity may be reduced up to about 60% of its original concentrate value, and the press-ready ink viscosity preferably ranges between about 15 and 30 seconds in a number 2 Zahn cup.

The weight percentages of the polyester (P Est.), polyurethane (PU), solvent, and pigment will of course vary depending on whether it is desired to produce an essentially dry concentrate, an aqueous concentrate, or a finished, press-ready, aqueous ink. Typical ranges for broad and preferred of these percentages (dry wt. %) are given in the following table.

|  | Broad | Preferred |
|---|---|---|
| Dry Concentrate | | |
| P Est. | 15–60 | 20–40 |
| Pigment | 40–85 | 50–75 |
| PU | 0.5–20 | 1–8 |
| Aqueous Concentrate | | |
| P Est. | 10–40 | 15–35 |
| Pigment | 30–75 | 35–65 |
| PU | 0.2–15 | 0.5–12 |
| Solvent | 1.0–40 | 5–25 |
| Press-Ready Ink | | |
| P Est. | 3–30 | 10–18 |
| Pigment | 0.1–40 | 20–35 |
| PU | 0.1–10 | 0.5–5 |
| Solvent | 40–75 | 45–60 |

It is noted that the solvent in the above ranges is, of course, mostly water. However, up to about 30 wt. % of the water may be replaced with miscible cosolvents such as diethylene glycol monomethyl ether, propylene glycol, ethylene glycol, diethylene glycol, n-propyl alcohol, isopropyl alcohol, ethyl alcohol, glycerin, ethylene glycol monoethyl ether, ethylene glycol monopropyl ether, ethylene glycol monobutyl ether, diethylene glycol monoethyl ether, diethylene glycol monopropyl ether, and diethylene glycol monobutyl ether, or mixtures thereof.

The following examples will further illustrate practice of the invention.

EXAMPLE A

Polyester Preparation

A mixture of 79.5 g (0.41 mole) of dimethyl isophalate, 26.6 g (0.09 mole) of dimethyl-5-sodiosulfoisophthalate, 54.1 g (0.51 mole) of diethylene glycol, 37.4 (0.26 mole) of 1,4-cyclohexanedimethanol, 1.4 mL of a 1.0% (based on Ti) catalyst solution of titanium tetraisopropoxide, and 0.74 g (0.009 mole) of sodium acetate buffer is stirred and heated for two hours at 200°–220° C. The temperature is then raised to 275° C. and a vacuum of 0.3 mm is applied. Heating and stirring is continued for 1 hour under these conditions. After cooling, the polymer obtained has an I.V. of 0.36 and is tough and rubbery and is dissipatable in hot water to the extent of about 25 wt. % to give a clear, slightly viscous solution. The composition of the acid moieties of this polyester material is analyzed to be 82 mole % isophthalic acid residue and 18 mole % 5-sodiosulfoisophthalic acid residue, and of the glycol moieties is analyzed to be 54 mole % diethylene glycol and 46 mole % 1,4-cyclohexanedimethanol. This material is designated hereinafter as "Polymer-A".

EXAMPLE B

Polyesters designated (a), (b), (c) and (d) were prepared essentially in accordance with Example 1 of the aforementioned U.S. Pat. No. 4,233,196 from the following materials:

| (a) | g. moles |
|---|---|
| Dimethyl Isophthalate (IPA) | 0.415 |
| Dimethyl-5-Sodiosulfoisophthalate (SIP) | 0.085 |
| 1,4-Cyclohexanedimethanol (CHDM) | 0.520 |
| Carbowax 1000 (CW 1000) | 0.0237 |
| Sodium Acetate | 0.0085 |
| Irganox 1010 | 0.0085 |

The Carbowax 1000 has the structure H$-$(OCH$_2-$CH$_2$)$_n$OH wherein n is about 22. The polymer analyzed by NMR contains (in reacted form) about 83 mole % IPA, about 17 mole % SIP, about 94.5 mole % CHDM, and about 5.5 mole % of CW 1000, and has an I.V. of about 0.39.

| (b) | g. moles |
|---|---|
| Dimethyl Isophthalate | 0.328 |
| Dimethyl-5-Sodiosulfoisophthalate | 0.072 |
| 1,4-Cyclohexanedimethanol | 0.442 |
| Carbowax 400 (n = 10) | 0.058 |
| Sodium Acetate | 0.0072 |

The polymer as analyzed by NMR contains (in reacted form) about 82 mole % IPA, about 18 mole % SIP, about 85.5 mole % CHDM and about 14.5 mole % CW 400, and has an I.V. of about 0.46.

| (c) | g. moles |
|---|---|
| Dimethyl Isophthalate | 0.41 |
| Dimethyl-5-Sodiosulfoisophthalate | 0.09 |
| 1,4-Cyclohexanedimethanol | 0.55 |
| Carbowax 4000 (n = 90) | 0.0005 |
| Sodium Acetate | 0.009 |

The polymer as analyzed by NMR contains (in racted from) about 82 mole % IPA, about 18 mole % SIP, about 99.9 mole % CHDM and about 0.1 mole % CW 4000, and has an I.V. of about 0.16.

| (d) | g. moles |
|---|---|
| Dimethyl Isophthalate | 0.205 |
| Dimethyl-5-Sodiosulfoisophthalate | 0.045 |
| Ethylene Glycol (EG) | 0.9638 |
| Carbowax 2000 (n = 45) | 0.03625 |
| Sodium Acetate | 0.0045 |

The polymer as analyzed by NMR contains (in reacted from) about 82 mole % IPA, about 18 mole % SIP, about 85.5 mole % EG and about 14.5 mole % CW 2000, and has an I.V. of about 0.34.

In such polymers containing the Carbowax material, the n value is preferably between about 6 and 150.

Mixing or blending of the polyester with the polyurethane can be done at any stage prior to making of the finished coating formulation. Typical mixing techniques are (1) melt-phase or roll-milling of the polymers, (2) codispersion in water or water-solvent blends, (3) mixing of predispersed polyester and predispersed polyurethane by simple agitation, of (4) any suitable combination of those techniques.

The amounts of polyester and polyurethane in the aqueous blends is dictated by desired end-use properties. For certain water-based inks, aqueous ink concentrates, clear extenders, and over-print varnishes, the polyester concentration based on total blend weight is typically 5.0–40 wt. %, while the polyurethane is typically 0.1–15 wt. %.

The increase in viscosity achieved through the use of the polyurethane depends on the ratios of $H_2O$/polyester/polyurethane, and can range from no increase to an increase of many thousand centipoise (gelled state). This flexibility is important for many reasons. For example, the thixotropic nature of the polyester systems is mostly eliminated through blending with the polyurethane, which makes possible the formulation of flowable, very high viscosity pigment concentrates, which do not thin in the high shear, high temperature milling processes, thereby improving milling efficiency (pigment development) and reducing mill wear. Also, the blending allows better correlation of the static viscosity measurements used by pressmen for convenience (Zahn or Shell cups representing the actual viscosity created by the higher shear conditions on the press) thereby giving better print quality control and reproducibility. Also, because inks made with only the polyester tend to be very thin, the increased viscosity given by the blends more readily enables the inks to be used in applications where the higher viscosities are required.

Morevoer, the present blends increase the economy of the inks since the polymer weight level can be reduced, for some applications, for example, by as much as about 75% while maintaining or exceeding the original ink quality. The following examples demonstrate the invention.

EXAMPLE 1

An aqueous master batch was made containing 14.0 dry wt. % of finely ground C.I. Pigment Red 57:1, 13.6 dry wt. % Polymer -A, and 7.2 wt. % normal propyl alcohol. The blending was done by mixing with low shear agitation, a finely ground pigment concentrate (28 wt. % aqueous mix) into a water/n-propanol dispersion of Polymer -A.
A. The above master batch was then let down with a water dispersion of Polymer -A into a press-ready ink comprised of 7.0 dry wt. % C.I. Pogment Red-57, 20.0 dry wt. % Polymer -A, 5.0 wt. % normal propyl alcohol, and 68.0 wt. % water. This ink had a viscosity of 18.5 seconds on a No. 2 Zahn cup.
B. To the ink of A above was added with low shear mixing 1.5 wt. % of 25% active polyurethane material. This ink had a viscosity of 30.5 seconds on a No. 2 Zahn cup. The 25% active polyurethane material cmprised about 24–26 wt. % polyurethane. about 18–19 wt. % diethylene glycol monobutyl ether, and about 56–57 wt. % water and is sold by Rohm and Haas Company under the Trademark ACRYSOL® RM-825. This material is described in the Trade Sales Coatings brochure entitled "Polymers, Resins and Monomers, ACRYSOL® RM-825 Rheology Modifier For Coatings" c Rohm and Haas Company, 1985.
Both inks A and B were then drawn down on Pen-o-Pac paper stock with an No. 6 RD rod. By comparison, the addition of ACRYSOL RM-825 boosted the viscosity to a more desirable printing level while maintaining gloss, shade, pring quality, and the like.

EXAMPLE 2

Two viscosity modifiers as described below were added to a press-ready ink consisting of 22.4 dry wt. % Polymer -A, 7.0 dry wt. % C.I. Pigment Red-57, 0.5 wt. % Tektamer 38AD biocide (@ 25% active), 0.2 wt. % of Surfynol 104E wetting agent (@ 50% active), and 6.2 wt. % normal propyl alcohol.
A. A water solution of Kelzan®, a sodium salt of Xanthan gum, was stirred into the press-ready ink at 0.06 dry wt. % yielding a viscosity of 31.0 seconds on a No. 2 Zahn cup.
B. ACRYSOL RM-825 (@ 25% active) was stirred into the press-ready ink at 2.0 wt. %, yielding a viscosity of 32.0 seconds on a No. 2 Zahn cup.

Inks A and B were then drawn down in essentially the same manner as in Example 1. Results showed that ink A had yellowed in shade, although the gloss was similar to the control. The ACRYSOL RM-825 containing ink B performed essentially the same as observed for ink B of Example 1.

EXAMPLE 3

The experiment in Example 2 was repeated using ACRYSOL RM-825 versus partially hydrolized polyvinyl alcohol (Vinol 540) described in the sales brochure of Air Products and Chemicals, Inc., titled "VINOL TM POLYVINYL ALCOHOLS", No. 152-901.
A. ACRYSOL RM-825 at 1.5 wt. % (@ 25% active) was incorporated into the press-ready ink to give a viscosity of 27.0 seconds on a No. 2 Zahn cup.
B. Polyvinyl alcohol (PVA) at 1.5 wt. % (@ 25% active) was incorporated into the press-ready ink to give a viscosity of 53.5 seconds on a No. 2 Zahn cup. The PVA is described in "MATERIAL SAFETY DATA SHEET" entitled "POLYVINYL ALCOHOL, Standard Grades" of Air Product and Chemicals, Inc., c Air Products and Chemicals, Inc., 1979, Revision 1, Jan. 1, 1980.

Inks A and B were drawn down in essentially the same manner as in Example 1. Results showed the PVA ink B to exhibit a severe loss of gloss with some shade change, while the ACRYSOL RM-825 ink A results were essentially the same as observed for ink B of Example 1.

EXAMPLE 4

The same experiment as in Example 2 was repeated using ACRYSOL G-110 of Rohm Haas Company, versus ACRYSOL RM-825 in a press-ready ink formulation.
A. The ACRYSOL G-110 ink had a viscosity of 28.0 seconds on a No. 2 Zahn cup. This material is described in the Trade Sales Coatings brochure of Rohm and Haas Co. entitled ACRYSOL® G-110 THICKENER FOR LATEX PAINTS, c Rohm and Haas Co., 1982.
B. The ACRYSOL RM-825 ink had a viscosity of 27.0 seconds on a No. 2 Zahn cup.

Inks A and B were then drawn down in essentially the same manner as in Examples 1-3. The ACRYSOL G-110 ink was hazy with low gloss and transparency while the ACRYSOL RM-825 ink was essentially the same as observed for B of Example 1.

EXAMPLE 5

The experiment in Example 2 was repeated using ACRYSOL RM-825 versus Hydroxyethyl Cellulose, a Nonionic water soluble ether of cellulose from Union Carbide Corp. described in Product Specification, Sept. 4, 1986, 1-44c.QP100MH-1h, 1904900.
A. A water solution of Hydroxyethyl Cellulose at 0.5 wt. % (dry) was incorporated into a press ready ink and gave a 62.0 second viscosity on a No. 2 Zahn cup.
B. ACRYSOL RM-825 at 1.5 wt. % (@ 25% active) was incorporated into the same press-ready ink and gave a 27.0 second viscosity on a No. 2 Zahn cup.

Inks A and B were then drawn down in essentially the same manner as in Example 1, showing the Hydroxyethyl Cellulose containing ink to have changed markedly in shade. The ACRYSOL RM-825 containing ink was essentially the same as observed for B of Example 1.

EXAMPLE 6

The experiment in Example 2 was repeated using ACRYSOL RM-825 versus EMA, an Ethylene Maleic Anhydride copolymer described in Technical Bulletin No. 1C/FP-7 entitled "EMA ®", of Monsanto Company.

A. ACRYSOL RM-825 at 1.5 wt. % (@ 25% active) was incorporated into a press-ready ink and yielded a viscosity of 27.0 seconds on a No. 2 Zahn cup.

B. EMA at 0.25 dry wt. % was incorporated into the same press-ready ink and yielded a viscosity of 21.0 seconds on a No. 2 Zahn cup.

Inks A and B were then drawn down in essentially the same manner as in Example 1. The EMA ink showed a great loss of gloss, and very poor print quality. The ACRYSOL RM-825 ink results were essentially the same as observed for B of Example 1.

EXAMPLE 7

The experiment in Example 2 was repeated using ACRYSOL RM-825 versus Stymer S ®, a sodium salt of a polystyrene/maleic anhydride copolymer marketed by Monsanto Company and described in the accompanying brochure titled Stymer S ® Resin For Warp Sizing, Pub. No. 5013C.

A. ACRYSOL RM-825 at 1.5 wt. % (@ 25% active) was incorporated into the press-ready ink and yielded 27.0 seconds on a No. 2 Zahn cup.

B. Stymer S ® at 1.5 wt. % was incorporated into the same press-ready ink and yielded over 60.0 seconds on a No. 2 Zahn cup.

Inks A and B were then drawn down in essentially the same manner as in Example 1 showing the Stymer ink to be hazy with low gloss and transparency. The ACRYSOL RM-825 ink was essentially the same as observed for B of Example 1.

EXAMPLE 8

In this example two ink formulations, (1) which was a control, and (2) representing the present invention, each containing fairly high pigment loadings were processed on the same equipment under essentially the same conditions. Formulation (1), the control, contained the following ingredients in % by weight:
33.3% Carbon Beads (Raven 1020)
43.3% AQ 55 (33% Polymer in Water)
2.3% NPA (n-Propyl Alcohol)
2.8% Surfynol 104E (Dispersant-Surfactant -Antifoam)
0.8% Merpol LFH (Low Cloud Pt. Polyether Surfactant)
17.5% H$_2$O (Additional)
Formulation (2) of the present invention is the same as (1) except for
0.91% Acrysol RM-825 (25% Active) and
16.5% H$_2$O (Additional)
The 25% active polyurethane material comprises about 24–26 wt. % polyurethane, 18–19 wt. % diethylene glycol monobutyl ether, and about 56–57 wt. % water and is sold by Rohm and Haas Company under the Trademark ACRYSOL ® RM-825. This material is described in the Trade Sales Coatings brochure entitled "Polymers, Resins and Monomers, ACRYSOL ® RM-825 Rheology Modifier For Coatings" Rohm and Haas Company, 1985.

The premixing conditions for each of these formulations was 10 minutes at 4,000 rmp (gauge) and 3 minutes at 6,000 rmp (gauge) on a Hockmeyer mixer. The subsequent milling was done on a Dynomill Horizontal Mill (85% filled with 0.5–0.8 mm SAZ beads (zirconium silicate) at a feed rate of about 0.25 lb/minute. The exact procedures were as follows:

CONTROL FORMULATION (1)

The liquid ingredients, except the additional water, were placed in a mixing bucket for a Hockmeyer Discperser and the carbon black beads were added over a 10-minute period at 1,000 rpm. The additional water was not added in order to optimize viscosity. After mixing, the batch was dispersed in the Hockmeyer Discperser at 6,000 rpm for 3 minutes and at 4,000 rpm (machine gauge reading) for 10 minutes. The resulting temperature was 27° C. The additional water was then added. This premix was then transferred to the mill feed funnel of the Dynomill mill and milled at a rate of about 0.25 lb/minute. After about 5 minutes, the gear pump jammed with undispersed pigment beads. A portion of the premix and milled sample were saved, but about three quarters of the batch could not be milled because of insufficient premixing.

FORMULATION (2)

Premixed as with the control except all of the additional water was added initially. The premix maximum temperature was about 60° C., reflecting the increase in heat generated by the higher viscosity. The premix was milled at a rate of 0.277 lb/minute with a feed outlet temperature of 50° C. No settling of undispersed beads or pump plugging, or other problems were encountered because the beads were broken adequately in the premix.

The following properties of the two blends were determined:

| Formulation (1) | | Formulation (2) | |
|---|---|---|---|
| % of Pigment Retained on 325 Mesh Screen (>42 Microns) | | | |
| On Wt. Total | On Wt. Pigment | On Wt. Total | On Wt. Pigment |
| 31.1% | 93.4% | 7.6% | 22.8% |
| Physical Appearance | | | |
| Very thin, many unbroken beads which settled. | | Very thick, smooth, no settling. | |
| % Solids in Milled Material | | | |
| 44.1% (From Beads Settling and Being Held Up in Pump) | | 49.3% (Predicted Theoretical Solids = 49.8%) | |

MILLED RESULTS

The Formulation (1) beads were not broken sufficiently to feed properly. After only a few moments running time, the gear pump jammed, and the run was discontinued. No problems were encountered with the Formulation (2) sample.

| Formulation (1) | | | Formulation (2) | | |
|---|---|---|---|---|---|
| Milled Particle Size in Microns Determined on Leeds and Northrup Instrument | | | | | |
| Less Than | | | Less Than | | |
| 18% | 50% | 84% | 18% | 50% | 84% |
| 0.28μ | 0.52μ | 0.88μ | 0.28μ | 0.43μ | 0.78μ |
| Surface Area of Milled Particles | | | | | |

-continued

| Formulation (1) | Formulation (2) |
|---|---|
| 14.627 m²/g | 15.255 m²/g |

INK STRENGTH

Formulation (1) was much weaker (~25% less) than Formulation (2) because of loss of pigment (bead settling) and because of lower surface area.

| Formulation (1) Spindle 3 | | | Formulation (2) Spindle 7 | | |
|---|---|---|---|---|---|
| 20 rpm | 50 rpm | 100 rpm | 20 rpm | 50 rpm | 100 rpm |
| Brookfield Model RVT ® Viscosity of Premix | | | | | |
| 75 cps | 54 cps | | 92,800 cps | 63,000 cps | |
| Brookfield Model RVT Viscosity of Milled Material | | | | | |
| 1,635 cps | 874 cps | 564 cps | 60,000 cps | 42,000 cps | 29,200 cps |

The millbase was diluted as follows:
15% millbase
69.3% of polymer extender containing 32.5 polymer, 5% n-propyl alcohol in H₂O.
15.7% H₂O Both inks were then drawn down on Pen-o-Pac paper stock with a No. 6 RD rod. By comparison, Formulation (2) showed increased viscosity which gave a more desirabe printing level while maintaining gloss, shade, print quality, and the like when compared to Formulation (1). The ink strength of the control (Formula 1) was ~25% less because of pigment loss caused by settling in the premix.

In accordance with the present invention, inks prepared from the present blends, with or without various property modifiers such as polyvinyl alcohol, Pluronic ® or the like, have been found to be unexpectedly superior as stated above over prior aqueous inks, and also with respect to one or more of such properties as flow-out or printability, pigment wetting, pigment stability, temperature stability (heat and freeze-thaw), nonsettling for extended periods of time, nonpolluting with respect to odor and volatile organics, nonflocculating, wide viscosity range inks, adhesion to a variety of substrates, hardness, gloss, drying rate on substrates, resistance to grease, water and scuff, compatibility with other water-based inks, wet rub resistance, ink mileage characteristics (considerable water dilution allowable at the press), ink press stability in general, printability (clean, sharp transfer without "stringing or misting"), trapping, easy clean up, nonplugging of printing plates, flexibility, redispersibility or rewetting, crinkle resistance, high pigment loading, solvent resistance, alkali, chemical and detergent resistance, blocking resistance, lightfastness, toughness, substrate wetting, hold-out, dry-rate, and no offset on the printing press (coating, e.g., on tension rollers).

The invention has been described in detail with particular reference to preferred embodiments thereof, but it will be understood that variations and modifications can be effected within the spirit and scope of the invention.

We claim:

1. A composition comprising a substantially homogenous blend of from about 99.9 to about 50.0 wt. % water dispersible polyester and from about 0.1 to about 50.0 wt. % water dispersible polyurethane, wherein the water dispersible polyester comprises at least one linear, water-dissipatable polymer having carbonyloxy linking groups in the linear molecular structure wherein up to 80% of the linking groups may be carbonylamido linking groups, the polymer having an inherent viscosity of from about 0.1 to about 1.0 measured in a 60/40 parts by weight solution of phenol/tetrachloroethane at 25° C. and at a concentration of 0.25 gram of polymer in 100 mL of the solvent, the polymer comprising the condensation reaction products of (a), (b), (c) and (d) from the following reactants or ester forming or esteramide forming derivatives thereof;
   (a) at least one difunctional dicarboxylic acid which is not a sulfomonomer;
   (b) from about 4 to about 25 mole percent, based on a total of all acid, hydroxyl and amino equivalents being equal to 200 mole percent, of at least one difunctional sulfomonomer containing at least one metallic sulfonate group attached to an aromatic hydrocarbon nucleus or cycloaliphatic nucleus wherein the functional groups are hydroxy, carboxyl or amino;
   (c) at least one difunctional which is not a sulfomonomer selected from a glycol or a mixture of a glycol and diamine having two —NRH groups, the glycol containing two —CH₂—OH groups of which
      (1) at least 15 mole percent based on 100 mole percent of hydroxy or hydroxy and amino equivalents, is a poly(ethylene glycol) having the structural formula

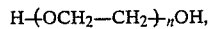

n being an integer of from 2 to about 20, or
      (2) of which from about 0.1 to less than about 15 mole percent based on 100 mole percent of hydroxy or hydroxy and amino equivalents, is a poly(ethylene glycol) having the structural formula

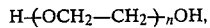

n being an integer of between 2 and about 500, and with the proviso that the mole percent of said poly(ethylene glycol) within said range is inversely proportional to the quantity of n within said range; and
   (d) from none to at least one difunctional reactant selected from a hydroxycarboxylic acid having one —C(R)₂—OH group, an aminocarboxylic acid having one —NRH group, and an amino-alcohol having one —C(R)₂—OH group and one —NRH group, or mixtures of said difunctional reactants; wherein each R in the (c) or (d) reactants is a H atom or an alkyl group of 1 to 4 carbon atoms; and wherein from none to about 60 wt. % of pigment material based on total polymer weight is present admixed into the composition, and wherein the water dispersible polyurethane has a molecular weight of at least 10,000 and at least three hydrophobic branching groups.

2. A dispersion of a composition comprising a substantially homogenous blend of from about 99.9 to about 50.0 wt. % water dispersible polyester and from about 0.1 to about 50.0 wt. % water dispersible polyurethane having a molecular weight of at least 10,000 and at least three hydrophobic branching groups in a solvent system comprising water or water admixed with water miscible cosolvent which comprises up to about 30.0 wt. % of said solvent system, said solvent system comprising from about 1.0 to about 95.0 wt. % of the total dispersion weight.

3. The dispersion of claim 2 wherein the solvent system comprises from about 30 to about 90 wt. % of the total dispersion weight.

4. The dispersion of claim 2 wherein the weight % of the polyester is from about 5.0 to about 33.0, the % of the polyurethane is from about 0.01 to about 10.0, the weight % of the solvent system is from about 30.0 to about 90.0, and said dispersion further comprises a colorant and the weight % of colorant is from 0 to about 25.0.

5. The dispersion of claim 2 wherein the cosolvent is selected from diethylene glycol monomethyl ether, propylene glycol, ethylene glycol, diethylene glycol, n-propyl alcohol, isopropyl alcohol, ethyl alcohol, glycerin, ethylene glycol monoethyl ether, ethylene glycol monopropyl ether, ethylene glycol monobutyl ether, diethylene glycol monoethyl ether, diethylene glycol monopropyl ether, and diethylene glycol monobutyl ether or mixtures thereof.

6. The composition of claim 1 containing from about 1.0 to about 80.0 wt. % colorant.

7. The dispersion of claim 2 wherein the polyester material comprises at least one linear, water-dissipatable polymer having carbonyloxy linking groups in the linear molecular structure wherein up to 80% of the linking groups may be carbonylamido linking groups, the polymer having an inherent viscosity of from about 0.1 to about 1.0 measured in a 60/40 parts by weight solution of phenol/tetrachloroethane at 25° C. and at a concentration of 0.25 gram of polymer in 100 mL of the solvent, the polymer comprising the condensation reaction products of (a), (b), (c) and (d) from the following reactants or ester forming or esteramide forming derivatives thereof;

(a) at least one difunctional dicarboxylic acid which is not a sulfomonomer;

(b) from about 4 to about 25 mole percent, based on a total of all acid, hydroxyl and amino equivalents being equal to 200 mole percent, of at least one difunctional sulfomonomer containing at least one metallic sulfonate group attached to an aromatic hydrocarbon nucleus or cycloaliphatic nucleus wherein the functional groups are hydroxy, carboxyl or amino;

(c) at least one difunctional reactant which is not a sulfomonomer selected from a glycol or a mixture of a glycol and diamine having two —NRH groups, the glycol containing two —CH$_2$—OH groups of which (1) at least 15 mole percent based on 100 mole percent of hydroxy or hydroxy and amino equivalents, is a poly(ethylene glycol) having the structural formula

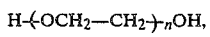

n being an integer of from 2 to about 20, or (2) of which from about 0.1 to less than about 15 mole percent based on 100 mole percent of hydroxy or hydroxy and amino equivalents, is a poly(ethylene glycol) having the structural formula

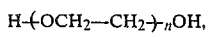

n being an integer of between 2 and about 500, and with the proviso that the mole percent of said poly(ethylene glycol) within said range is inversely proportional to the quantity of n within said range; and (d) from none to at least one difunctional reactant selected from a hydroxycarboxylic acid having one —C(R)$_2$—OH group, an aminocarboxylic acid having one —NRH group, and an amino-alcohol having one —C(R)$_2$—OH group and one —NRH group, or mixtures of said difunctional reactants; wherein each R in the (c) or (d) reactants is a H atom or an alkyl group of 1 to 4 carbon atoms; and wherein from none to about 60 wt. % of pigment material based on total polymer weight is present admixed into the composition.

8. The dispersion of claim 3 wherein the polyester material comprises at least one linear, water-dissipatable polymer having carbonyloxy linking groups in the linear molecular structure wherein up to 80% of the linking groups may be carbonylamido linking groups, the polymer having an inherent viscosity of from about 0.1 to about 1.0 measured in a 60/40 parts by weight solution of phenol/tetrachloroethane at 25° C. and at a concentration of 0.25 gram of polymer in 100 mL of the solvent, the polymer comprising the condensation reaction products of (a), (b) (c) and (d) from the following reactants or ester forming or esteramide forming derivatives thereof;

(a) at least one difunctional dicarboxylic acid which is not a sulfomonomer;

(b) from about 4 to about 25 mole percent, based on a total of all acid, hydroxyl and amino equivalents being equal to 200 mole percent, of at least one difunctional sulfomonomer containing at least one metallic sulfonate group attached to an aromatic hydrocarbon nucleus or cycloaliphatic nucleus wherein the functional groups are hydroxy, carboxyl or amino;

(c) at least one difunctional reactant which is not a sulfomonomer selected from a glycol or a mixture of a glycol and diamine having two —NRH groups, the glycol containing two —CH$_2$—OH groups of which (1) at least 15 mole percent based on 100 mole percent of hydroxy or hydroxy and amino equivalents, is a poly(ethylene glycol) having the structural formula

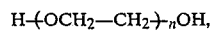

n being an integer of from 2 to about 20, or (2) of which from about 0.1 to less than about 15 mole percent based on 100 mole percent of hydroxy or hydroxy and amino equivalents, is a poly(ethylene glycol) having the structural formula

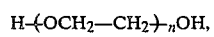

n being an integer of between 2 and about 500, and with the proviso that the mole percent of said poly(ethylene glycol) within said range is inversely porportional to the quantity of n within said range; and (d) from none to at least one difunctional reactant selected from a hydroxycarboxylic acid having one —C(R)₂—OH group, an aminocarboxylic acid having one —NRH group, and an amino-alcohol having one —C(R)₂—OH group and one —NRH group, or mixtures of said difunctional reactants; wherein each R in the (c) or (d) reactants is a H atom or an alkyl group of 1 to 4 carbon atoms; and wherein from none to about 60 wt. % of pigment material based on total polymer weight is present admixed into the composition.

9. The dispersion of claim 4 wherein the polyester material comprises at least one linear, water-dissipatable polymer having carbonyloxy linking groups in the linear molecular structure wherein up to 80% of the linking groups may be carbonylamido linking groups, the polymer having an inherent viscosity of from about 0.1 to about 1.0 measured in a 60/40 parts by weight solution of phenol/tetrachloroethane at 25° C. and at a concentration of 0.25 gram of polymer in 100 mL of the solvent, the polymer comprising the condensation reaction products of (a), (b), (c) and (d)) from the following reactants or ester forming or esteramide forming derivatives thereof;
  (a) at least one difunctional dicarboxylic acid which is not a sulfomonomer;
  (b) from about 4 to about 25 mole percent, based on a total of all acid, hydroxyl and amino equivalents being equal to 200 mole percent, of at least one difunctional sulfomonomer containing at least one metallic sulfonate group attached to an aromatic hydrocarbon nucleus or cycloaliphatic nucleus wherein the functional groups are hydroxy, carboxyl or amino;
  (c) at least one difunctional reactant which is not a sulfomononmer selected from a glycol or a mixture of a glycol and diamine having two —NRH groups, the glycol containing two —CH₂—OH groups of which
    (1) at least 15 mole percent based on 100 mole percent of hydroxy or hydroxy and amino equivalents, is a poly(ethylene glycol) having the structural formula

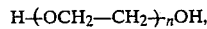

n being an integer of from 2 to about 20, or
    (2) of which from about 0.1 to less than about 15 mole percent based on 100 mole percent of hydroxy or hydroxy and amino equivalents, is a poly(ethylene glycol) having the structural formula

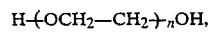

n being an integer of between 2 and about 500, and with the proviso that the mole percent of said poly(ethylene glycol) within said range is inversely proportional to the quantity of n within said range; and (d) from none to at least one difunctional reactant selected from a hydroxycarboxylic acid having one —C(R)₂—OH group, an aminocarboxylic acid having one —NRH group, and an amino-alcohol having one —C(R)₂—OH group and one —NRH group, or mixtures of said difunctional reactants; wherein each R in the (c) or (d) reactants is a H atom or an alkyl group of 1 to 4 carbon atoms; and wherein from none to about 60 wt. % of pigment material based on total polymer weight is present admixed into the composition.

10. The composition of claim 1 wherein the n value of reactant (c) is between 2 and about 200.

11. The composition of claim 1 wherein the polyester materials have an inherent viscosity of from about 0.28 to about 0.38, an acid moiety of from about 75 to about 84 mole % isophthalic acid and conversely form about 25 to about 16 mole % 5-sodiosulfoisophthalic acid, and a glycol moiety of from about 45 to about 60 mole % diethylene glycol and conversely from about 55 to about 44 mole % 1,4-cyclohexanedimethanol or ethylene glycol or mixtures thereof, and the pigment material is present in a weight ratio with respect to total polyester materials of from about 1/10 to about 2/1.

12. The dispersion of claim 7 wherein the polyester materials have an inherent viscosity of from about 0.28 to about 0.38, an acid moiety of from about 75 to about 84 mole % isophthalic acid and conversely from about 25 to about 16 mole % 5-sodiosulfoisophthalic acid, and a glycol moiety of from about 45 to about 60 mole % diethylene glycol and conversely from about 55 to about 44 mole % 1,4-cyclohexanedimethanol or ethylene glycol or mixtures thereof, and the pigment material is present in a weight ratio with respect to total polyester materials of from about 1/10 to about 2/1.

13. The composition of claim 1 wherein said acid moiety comprises from about 80 to about 83 mole % isophthalic acid and conversely from about 20 to about 17 mole % 5-sodiosulfoisophthalic acid, and said glycol moiety comprises from about 52 to about 56 mole % diethylene glycol and conversely from about 48 to about 44 mole % 1,4-cyclohexanedimethanol.

14. The dispersion of claim 7 wherein said acid moiety comprises form about 80 to about 83 mole % isophthalic acid and conversely form about 20 to about 17 mole % 5-sodiosulfoisophthalic acid, and said glycol moiety comprises from about 52 to about 56 mole % diethylene glycol and conversely from about 48 to about 44 mole % 1,4-cyclohexanedimethanol.

15. The composition of claim 1 wherein the polyurethane is selected from a trimethylol propane/ethylene oxide adduct capped with octyldecyl isocyanate, a dipentaerythritol/ethylene oxide adduct capped with octyldecyl isocyanate, a trimethylol propane/ethylene oxide adduct reacted with a tolylene diisocyanate polyethylene glycol condensate and capped with octadecanol, a trimethylol propane/ethylene oxide/C₃₆ dimer acid diisocyanate/polyethylene glycol condensate capped with octadecyl isocyanate, a polyethylene glycol/4,4′methylenebis(isocyanatocyclohexane)/-triisocyanate adduct of trimethylol propane and tolylene dissocyanate capped with hexadecanol, a polyethylene glycol/methylenedi-p-phenylene diisocyanate/-triisocyanate adduct of trimethylol propane and tolylene diisocyanate condensate capped with eicosanol, a polyethylene glycol/tolylene diisocyanate/polymethylene polyphenylisocyanate condensate capped with octadecanol, a polyethlene glycol/trimethylol propane/tolylene diisocyanate condensate capped with octadecanol, a polyethylene glycol/tolylene diisocyanate/-dipentacrythritol condensate capped with octadecanol, and a polyethylene glycol/trimethylol propane/tolylene diisocyanate condensate capped with perfluorododecanol.

16. The dispersion of claim 7 wherein the polyurethane is selected from a trimethylol propane/ethylene oxide adduct capped with octyldecyl isocyanate, a dipentacerythritol/ethylene oxide adduct capped with octyldecyl isocyanate, a trimethylol propane/ethylene oxide adduct reacted with a tolylene diisocyanate polyethylene glycol condensate and capped with octadecanol, a trimethylol propane/ethylene oxide/C$_{36}$ dimer acid diisocyanate/polyethylene glycol condensate capped with octadecyl isocyanate, a polyethylene glycol/4,4'methylenebis(isocyanatocyclohexane)/-triisocyanate adduct of trimethylol propane and tolylene dissocyanate capped with hexadecanol, a polyethylene glycol/methylenedi-p-phenylene diisocyanate/-triisocyanate adduct of trimethylol propane and tolylene diiocyanate condensate capped with eicosanol, a polyethylene glycol/tolylene diisocyanate/polymethylene polyphenylisocyanate condensate capped with octadecanol, a polyethylene glycol/trimethylol propane/tolylene diisocyanate condensate capped with octadecanol, a polyethylene glycol/tolylene diisocyanate/dipentacrythritol condensate capped with octadecanol, and a polyethylene glycol/trimethylol propane/tolylene diisocyanate condensate capped with perfluorododecanol.

17. The dispersion of claim 4 wherein the colorant is one or a mixture of the following color index materials: C.I. Pigment Yellow 17; C.I. Pigment Blue 27; C.I. Pigment Red 49:2; C.I. Pigment Red 81:1; C.I. Pigment Red 81:3; C.I. Pigment Red 81:x; C.I. Pigment Yellow 83; C.I. Pigment Red 57:1; C.I. Pigment Red 49:1; C.I. Pigment Violet 23; C.I. Pigment Green 7; C.I. Pigment Blue 61; C.I. Pigment Red 48:1; C.I. Pigment Red 52:1; C.I. Pigment Violet 1; C.I. Pigment White 6; C.I. Pigment Blue 15; C.I. Pigment Yellow 12; C.I. Pigment Blue 56; C.I. Pigment Orange 5; C.I. Pigment Black 7; C.I. Pigment Yellow 14; C.I. Pigment Red 48:2; C.I. Pigment Blue 15:3; and C.I. Pigment Red 53:1; C.I. Pigment Yellow 42; C.I. Pigment Brown 6; C.I. Pigment Red 101; and C.I. Pigment Black 11.

18. The dispersion of claim 4 wherein the polyester material comprises from about 10 to about 20 weight %, the pigment material comprises from about 3.0 to about 15.0 weight %, the water comprises from about 20 to about 70 weight %, and the polyurethane comprises from about 0.5 to about 5.0 weight %.

19. The dispersion of claim 4 wherein the polyester comprises form about 15 to about 18 weight %, the colorant material comprises from about 5.0 to about 10.0 weight %, the water comprises from about 70 to about 80 weight %, and the polyurethane comprises from about 1.0 to about 5.0 weight %.

20. A process comprising blending a mixture comprising:
(a) a water dispersible polyester material which normally exhibits thixotrophic behavior,
(b) a colorant, which is essentially insoluble in the polyester material, in the form of aggregates, and
(c) an amount of a water dispersible polyurethane material, having a molecurlar weight of at least 10,000 and at least three hydrophobic branching groups, effective to result in the size of colorant aggregates to become reduced under sufficient blending conditions.
wherein the water dispersible polyester material is polyester material comprising at least one linear, water-dissipatable polymer having carbonyloxy linking groups in the linear molecular structure wherein up to 80% of the linking groups may be carbonylamido linking groups, the polymer having an inherent viscosity of from about 0.1 about 1.0 measured in a 60/40 parts by weight solution of phenol/tetrachloroethane at 25° C. and at a concentration of 0.25 gram of polymer in 100 mL of the solvent, the polymer comprising the condensation reaction products of (a), (b), (c) and (d) from the following reactants or ester forming or esteramide forming derivatives thereof;
(a) at least one least one difunctional dicarboxylic acid which is not a sulfomonomer;
(b) from about 4 to about 25 mole percent, based on a total of all acid, hydroxyl and amino equivalents being equal to 200 mole percent, of at least one difunctional sulfomonomer containing at least one metallic sulfonate group attached to an aromatic hydrocarbon nucleus or cycloaliphatic nucleus wherein the functional groups are hydroxy, carboxyl or amino;
(c) at least one difunctional reactant which is not a sulfomonomer selected from a glycol or a mixture of a glycol and diamine having two —NRH groups, the glycol containing two —CH$_2$—OH groups of which
(1) at least 15 mole percent based on 100 mole percent of hydroxy or hydroxy and amino equivalents, is a poly(ethylene glycol) having the structural formula

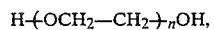

n being an integer of from 2 to about 20, or
(2) of which form about 0.1 to less than about 15 mole percent based on 100 mole percent of hydroxy or hydroxy and amino equivalents, is a poly(ethylene glycol) having the structural formula

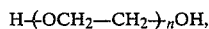

n being an integer of between 2 and about 500, and with the proviso that the mole percent of said poly(ethylene glycol) to the quality of n within said range; and
(d) from none to at least one difunctional reactant selected from a hydroxycarboxylic acid having one —C(R)$_2$—OH group, an aminocarboxylic acid having one —NRH group, and an amino-alcohol having one —C(R)$_2$—OH group and one —NRH group, or mixtures of said difunctional reactants; wherein each R in the (c) or (d) reactants is a H atom or an alkyl group of 1 to 4 carbon atoms.

21. A process comprising blending a mixture comprising:
(a) from about 3 to about 60 weight % of a water dispersible polyester material which normally exhibits thioxtrophic behavior,
(b) from about 0.1 to about 85 weight % of a colorant, which is essentially insoluble in the polyester material, in the form of aggregates, from about 0.1 to about 20 weight % of a water dispersible polyurethane material having a molecular weight of at least 10,000 and at least three hydrophobic branching groups, and from about 1 to about 75 weight % of a solvent comprising water,
under sufficient conditions such that the size of said aggregates is reduced.

22. The process of claim 21 wherein the solvent comprises from about 5 to about 60 weight % of said mixture.

23. The process of claim 21 wherein the weight % of component (A) is from about 5% to about 40%, the weight % of component (B) is from about 10% to about 75%, the weight % of component (C) is from about 0.2% to about 15%, and the weight percent of component (D) is from about 1% to about 40%.

24. The process of claim 20 carried out at a temperature of from about 0° C. to about 100° C.

25. The process of claim 20 carried out under forces that are the same or greater than those present in a high speed discperser operated at a peripheral speed of about 1,000 feet/minute.

26. The process of claim 25 wherein said peripheral speed is between about 4,000 and about 6,000 feet/minute, and said blending occurs for about 1 minute to about 1 hour.

27. The process of claim 20 wherein the average size of said aggregates before blending is greater than about 100 microns in diameter and the average size of said aggregates after blending is less than about 50 microns in diameter.

28. The process of claim 27 wherein the average size of said aggregate after blending is less than about 1 micron in diameter.

29. The proces of claim 20 wherein the solvent comprises water plus a cosolvent which is selected from diethylene glycol monomethyl ether, propylene, glycol, ethylene glycol, diethylene glycol, n-propyl alcohol, isopropyl alcohol, ethyl alcohol, glycerin, ethylene glycol monoethyl ether, ethylene glycol monopropyl ether, ethylene glycol monobutyl ether, diethylene glycol monoethyl ether, diethylene glycol monopropyl ether, and diethylene glycol monobutyl ether or mixtures thereof.

30. The process of claim 21 wherein the solvent comprises water plus a cosolvent which is selected from diethylene glycol monomethyl ether, propylene glycol, ethylene glycol, diethylene glycol, n-propyl alcohol, isopropyl alcohol, ethyl alcohol, glycerin, ethylene glycol monoethyl ether, ethylene glycol monobutyl ether, ethylene glycol monobutyl ether, diethylene glycol monoethyl ether, diethylene glycol monopropyl ether, and diethylene glycol monobutyl ether or mixtures thereof.

31. The process of claim 20 wherein the n value of reactant (c) (2) is between 2 and about 200.

32. The process of claim 20 wherein the polyester material has an inherent viscosity of from about 0.28 to about 0.38, an acid moiety of from about 75 to about 84 mole % isophthalic acid and conversely from about 25 to about 16 mole % 5-sodiosulfoisophthalic acid, and a glycol moiety of from about 45 to about 60 mole % diethylene glycol and conversely from about 55 to about 44 mole % 1,4-cyclohexanedimethanol or ethylene glycol or mixtures thereof.

33. The process of claim 20 wherein said water dispersible polymeric material comprise an acid moiety and a glycol moiety wherein said acid moiety comprises from about 80 to about 83 mole % isophthalic acid and conversely from about 20 to about 17 mole % 5-sodiosulfoisophthalic acid, and said glycol moiety comprises from about 52 to about 56 mole % diethylene glycol and conversely from about 48 to about 44 mole % 1,4-cyclohexanedimethanol.

34. The process of claim 20 wherein the polyurethane is selected from a trimethylol propane/ethylene oxide adduct capped with octyldecyl isocyanate, a dipentaerythritol/ethylene oxide adduct capped with octyldecyl isocyanate, a trimethylol propane/ethylene oxide adduct reacted with a tolylene diisocyanate polyethylene glycol condensate and capped with octadecanol, a trimethylol propane/ethylene oxide/$C_{36}$ dimer acid diisocyanate/polyethylene glycol condensate capped with octadecyl isocyanate, a polyethylene glycol/4,4-'methylenebis(isocyanatocyclohexane)/triisocyanate adduct of trimethylol propane and tolylene diisocyanate capped with hexadecanol, a polyethylene glycol/methylenedi-p-phenylene diisocyanate/triisocyanate adduct of trimethylol propane and tolylene diisocyanate condensate capped with eicosanol, a polyethylene glycol/tolylene diisocyanate/polymethylene polyphenylisocyanate condensate capped with octadecanol, a polyethylene glycol/trimethylol propane/tolylene diisocyanate condensate capped with octadecanol, a polyethylene glycol/tolylene diisocyanate/dipentacrythritol condensate capped with octadecanol, and a polyethylene glycol/trimethylol propane/tolylene diisocyanate condensate capped with perfluorododecanol.

35. The process of claim 20 wherein the colorant is one or a mixture of the following color index materials: C.I. Pigment Yellow 17; C.I. Pigment Blue 27; C.I. Pigment Red 49:2; C.I. Pigment Red 81:1; C.I. Pigment Red 81:3; C.I. Pigment Red 81:x; C.I. Pigment Yellow 83; C.I. Pigment Red 57:1; C.I. Pigment Red 49:1; C.I. Pigment Violet 23; C.I. Pigment Green 7; C.I. Pigment Blue 61; C.I. Pigment Red 48:1; C.I. Pigment Red 52:1; C.I. Pigment Violet 1; C.I. Pigment White 6; C.I. Pigment Blue 15; C.I. Pigment Yellow 12; C.I. Pigment Blue 56; C.I. Pigment Orange 5; C.I. Pigment Black 7; C.I. Pigment Yellow 14; C.I. Pigment Red 48:2; C.I. Pigment Blue 15:3; and C.I. Pigment Red 53:1; C.I. Pigment Yellow 42; C.I. Pigment Brown 6; C.I. Pigment Red 101; and C.I. Pigment Black 11.

36. A process comprising blending a mixture comprising:
(A) from about 10 to about 40 weight percent of a water dispersible polyester material comprising at least one linear, water-dissipatable polymer having carbonyloxy linking groups in the linear molecular structure wherein up to 80% of the linking groups may be carbonylamido linking groups, the polymer having an inherent viscosity of from about 0.1 to about 1.0 measured in a 60/40 parts by weight solution of phenol/tetrachloroethane at 25° C. and at a concentration of 0.25 gram of polymer in 100 mL of the solvent, the polymer comprising the condensation reaction products of (a), (b), (c) and (d) from the following reactants or ester forming or esteramide forming derivatives thereof:
(a) at least one difunctional dicarboxylic acid which is not a sulfomonomer;
(b) from about 4 to about 25 mole percent, based on a total of all acid, hydroxyl and amino equivalents being equal to 200 mole percent, of at least one difunctional sulfomonomer containing at least one metallic sulfonate group attached to an aromatic hydrocarbon nucleus or cycloaliphatic nucleus wherein the functional groups are hydroxy, carboxyl or amino;
(c) at least one difunctional reactant which is not a sulfomonomer selected from a glycol or a mixture of a glycol and diamine having two —NRH groups, the glycol containing two —CH$_2$—OH groups of which
(1) at least 15 mole percent based on 100 mole percent of hydroxy or hydroxy and amino equivalents, is a poly(ethylene glycol) having the structural formula

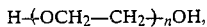

n being an integer of from 2 to about 20, or
(2) of which from about 0.1 to less than about 15 mole percent based on 100 mole percent of hydroxy or hydroxy and amino equivalents, is a poly(ethylene glycol) having the structural formula

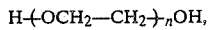

n being an integer of between 2 and about 500, and with the proviso that the mole percent of said poly(ethylene glycol) within said range is inversely proportional to the quantity of n within said range; and
(d) from none to at least one difunctional reactant selected form a hydroxycarboxylic acid having one —C(R)$_2$—OH group, an aminocarboxylic acid having one —NRH group, and an aminoalcohol having one —C(R)$_2$—OH group and one —NRH group, or mixtures of said difunctional reactants;
wherein each R in the (c) or (d) reactants is a H atom or an alkyl group of 1 to 4 carbon atoms,
(B) from about 30 to about 75 weight percent of a colorant wherein said colorant is one or a mixture of the following color index materials: C.I. Pigment Yellow 17; C.I. Pigment Blue 27; C.I. Pigment Red 49:2; C.I. Pigment Red 81:1; C.I. Pigment Red 81:3; C.I. Pigment Red 81:x; C.I. Pigment Yellow 83; C.I. Pigment Red 57:1; C.I. Pigment Red 49:1; C.I. Pigment Violet 23; C.I. Pigment Green 7; C.I. Pigment Blue 61; C.I. Pigment Red 48:1; C.I. Pigment Red 52:1; C.I. Pigment Violet 1; C.I. Pigment White 6; C.I. Pigment Blue 15; C.I. Pigment Yellow 12; C.I. Pigment Blue 56; C.I. Pigment Orange 5; C.I. Pigment Black 7; C.I. Pigment Yellow 14; C.I. Pigment Red 48:2; C.I. Pigment Blue 15:3; and C.I. Pigment Red 53:1; C.I. Pigment Yellow 42; C.I. Pigment Brown 6; C.I. Pigment Red 101; and C.I. Pigment Black 11, said colorant being in the form of aggregates,
(C) from about 0.2 to about 15 weight percent of a water dispersible polyurethane material having a molecular weight of at least 10,000 and at least three hydrophobic branching groups wherein said polyurethane material is one or a mixture of the following materials: a trimethylol propane/ethylene oxid adduct capped with octyldecyl isocyanate, a dipentaerythritol/ethylene oxide adduct capped with octyldecyl isocyanate, a trimethylol propane/ethylene oxide adduct reacted with a tolylene diisocyanate polyethylene glycol condensate and capped with octadecanol, a trimethylol propane/ethylene oxide/C$_{36}$ dimer acid diisocyanate/polyethylene glycol condensate capped with octadecyl isocyanate, a polyethylene glycol/4,4'methylenebis(isocyanatocyclohexane)/-triisocyanate adduct of trimethylol propane and tolylene diisocyanate capped with hexadecanol, a polyethylene glycol/methylenedi-p-phenylene diisocyanate/triisocyanate adduct of trimethylol propane and tolylene diisocyanate condensate capped with eicosanol, a polyethylene glycol/tolylene diisocyanate/polymethylene polyphenylisocyanate condensate capped with octadecanol, a polyethylene glycol/trimethylol propane/tolylene diisocyanate condensate capped with octadecanol, a polyethylene glycol/tolylene diisocyanate/-dipentacrythritol condensate capped with octadecanol, and a polyethylene glycol/trimethylol propane/tolylene diisocyanate condensate capped with perfluorododecanol, and
(D) from about 1 to about 40 weight percent of a solvent comprising water plus a cosolvent which is one or a mixture of the following cosolvents: diethylene glycol monomethyl ether, propylene, glycol, ethylene glycol, diethylene glycol, n-propyl alcohol, isopropyl alcohol, ethyl alcohol, glycerin, ethylene glycol monoethyl ether, ethylene glycol monopropyl ether, ethylene glycol monobutyl ether, diethylene glycol monoethyl ether, diethylene glycol monopropyl ether, and diethylene glycol monobutyl ether,
at a temperature of from about 0° to about 100° C., for about 1 minutes to about 1 hour, under forces that are the same or greater than those present in a high speed discperser operated at a peripheral speed of between about 4,000 and about 6,000 feet/minute, such that the average size of said aggregates before blending is greater than about 100 microns in diameter and the average size of said aggregates after blending is less than about 1 micron in diameter.

* * * * *

UNITED STATES PATENT AND TRADEMARK OFFICE
CERTIFICATE OF CORRECTION

PATENT NO. : 4,847,316

DATED : July 11, 1989

INVENTOR(S) : Martin F. Schick, William C. Hickman, Gary T. Clark, Rebecca R. Stockl It is certified that error appears in the above-identified patent and that said Letters Patent is hereby corrected as shown below:

Column 18, line 22, in Claim 1, after "difunctional", insert - - - reactant - - -.

Column 24, line 41, in Claim 20, after "poly(ethylene glycol)", insert - - - within said range is inversely proportional - - -.

Column 24, line 41, in Claim 20, "quality" should be - - - quantity - - -.

Column 24, line 58, in Claim 21, after "aggregates," insert - - - (c) - - -.

Column 24, line 62, in Claim 21, after "groups, and", insert - - - (d) - - -.

Signed and Sealed this

Twenty-fourth Day of April, 1990

Attest:

HARRY F. MANBECK, JR.

Attesting Officer

Commissioner of Patents and Trademarks